(12) United States Patent
Dickey

(10) Patent No.: US 6,361,703 B1
(45) Date of Patent: Mar. 26, 2002

(54) PROCESS FOR MICRO-TEXTURING A MOLD

(75) Inventor: Alan M. Dickey, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/262,233

(22) Filed: Mar. 4, 1999

(51) Int. Cl.$^7$ .................................................. B32B 1/08
(52) U.S. Cl. ............................ 216/9; 216/10; 216/41; 216/83; 216/8; 430/302
(58) Field of Search ........................... 216/41, 8, 9, 10, 216/83; 430/201, 302; 156/656, 659.1, 664; 277/345, 418, 590, 641, 643; 29/527.1

(56) References Cited

U.S. PATENT DOCUMENTS

| | | | |
|---|---|---|---|
| 3,475,241 A | 10/1969 | Zelley | 156/14 |
| 3,954,582 A | 5/1976 | Hepp et al. | 204/129.65 |
| 3,985,487 A | 10/1976 | Clark | 425/304 |
| 4,023,971 A | 5/1977 | Vested | 96/36.3 |
| 4,032,379 A | 6/1977 | Czirr et al. | 156/659 |
| 4,102,735 A | 7/1978 | Weglin | 156/661 |
| 4,444,399 A | 4/1984 | Yanai et al. | 277/1 |
| 4,582,566 A | 4/1986 | Grey | 156/651 |
| 5,007,984 A | * 4/1991 | Tsutsumi et al. | 156/656 |
| 5,348,314 A | 9/1994 | Antonini | 277/152 |
| 5,348,616 A | 9/1994 | Hartman et al. | 156/643 |
| 5,364,742 A | 11/1994 | Fan et al. | 430/317 |
| 5,389,313 A | 2/1995 | Imataki et al. | 156/643 |
| 5,575,962 A | * 11/1996 | Takahashi | 264/2.5 |
| 5,807,659 A | * 9/1998 | Nishimiya et al. | 430/302 |
| 5,811,215 A | * 9/1998 | Van Damme et al. | 430/201 |

FOREIGN PATENT DOCUMENTS

| | | |
|---|---|---|
| EP | 0850750 A2 | 9/1998 |
| GB | 1311509 | 3/1973 |

OTHER PUBLICATIONS

Abstract—FR 2,734,754A (Ugray) Used of Micro–Textured Moulds.

Abstract—WPI Abstract Accession No. 1992–223770/199227 & JP 4,151,208A (Sintokogyo) May 25, 1992.

* cited by examiner

Primary Examiner—Randy Gulakowski
Assistant Examiner—Jiri Smetana
(74) Attorney, Agent, or Firm—Haverstock, Garrett & Roberts

(57) ABSTRACT

The present invention relates to a method for producing a mold having a micro-textured surface, wherein the mold can be used to form an elastomeric seal having a micro-textured surface. The resulting seal will hold an amount of lubricant that is released with time, the release of the lubricant will result in decreased friction between the seal and a surface contacted by the seal.

11 Claims, No Drawings

PROCESS FOR MICRO-TEXTURING A MOLD

TECHNICAL FIELD

This invention relates generally to a method for micro-texturing molds, and more particularly, to a method for micro-texturing steel molds used to form a variety of devices, in particular elastomeric devices, such as seals.

BACKGROUND ART

Seals are used in a variety of applications where the seal is subjected to a high level of friction. An example, of a seal being subjected to increased friction is a seal ring, which is used in applications, such as in a transmission, for preventing or substantially limiting the leakage of liquids and pressure loss from portions of the transmission. Generally, the known seal rings are for sealing transmission clutch packs and are "wet seals", that is, both the high pressure and low pressure faces or sides of the seal ring are exposed to or are in communication with a liquid, such as a transmission oil or similar lubricant. The rotating seal rings typically include at least one face or side that is positioned in an opposing, face to face relation with a non-rotating surface of the transmission case for forming a sealed or substantially sealed condition therewith. The known seal rings are generally made of a hard polymer.

When in use in an engine or transmission, for example, the seal ring will move or be contacted by a moving device so that the seal ring is subjected to either axial or circumferential or rotational friction resulting from the movement of the seal ring or a device in contact with the seal ring. Often the outer circumferential wall of the seal ring will be in contact with a non-rotating or stationary metal surface of the transmission case. As such, the seal ring will potentially be in frictional contact with the transmission case, with the friction potentially causing the seal ring to erode or break-down. Also, the seal ring will often be placed around a moving member so that the inside circumferential wall of the seal ring is in contact with a moving member. This too will cause friction and potentially the eventual degradation of the seal ring. Because of the friction and stress that the seal ring is exposed to it is desired for the seal ring, as well as, other seals to be lubricated, specifically it is desired to increase the lubricity between a seal and the surfaces in contact with the seal so as to reduce friction.

While the seal ring is an example of a seal that can break-down because of friction, numerous other types of seals break-down as a result of friction. As such, it is desired to have a seal that can be lubricated. One way to increase the lubricity of a seal is to texturize the seal so that reservoirs or gaps are included in the seal construction, with the reservoirs holding an amount of oil. The oil will preferably leak away from the seal and lubricate the space between the seal and the surface contacted by the seal. It should be pointed out that the reservoir or texturing should not be too deep, otherwise the oil or other lubricant will not leak away from the seal. Instead the oil will be held in the reservoir or texturing of the seal, which will prevent the lubrication of the space between the seal and the surface contacted by the seal. Thus, it is desirable to have a method for forming a seal that is texturized or has small reservoirs or gaps included in its construction. It is further desired for the texturing of the seal to be of a sufficient size to cause lubrication between the seal and the surfaces contacted by the seal. More particularly, it is desired to have a method for micro-texturing a mold so that a seal having a micro-textured surface can be formed, with the micro-textured seal allowing for the lubrication of the space located between the seal and the surfaces contacted by the seal.

It should also be pointed out that until recently it was believed to be unknown to produce a texturized seal. Traditionally, it was believed that a seal should have a smooth surface. For this reason, methods for producing texturized seals have been unknown and, in particular, methods for producing a micro-textured seal have been unknown. Thus, it is desired to have methods for producing a micro-textured seal.

It has been known to acid etch steel molds so as to form a texture in a particular steel mold and form a textured finished product from the steel mold. To acid etch the steel mold, traditionally a photograph has been taken of the desired texture with a full-scale reproduction of the texture reproduced to form a mask used to etch the steel mold. The texture created by this method has typically been a macro-texture, in other words a texture designed for purposes other than holding a small amount of liquid. This method has not been intended to be used to micro-texture a steel mold to allow for production of a seal having a micro-texture surface. Thus, this method is generally not suitable for forming a mold that can produce a product having a micro-textured surface. Another problem is that full-scale reproductions are disadvantageous because the ability to etch certain patterns in steel molds has been limited. Thus, it is desired to have a method for acid etching a steel mold that does not involve a full-scale reproduction and that can etch a wider variety of patterns, in particular micro-textures.

Accordingly, the present invention is directed to overcoming one or more of the problems as set forth above.

DISCLOSURE OF THE INVENTION

In one aspect of the present invention a method is practiced which allows for the production of a mold having a micro-textured surface. More particularly, the present invention relates to a method for producing a mold having a micro-textured surface whereby the mold can be used to form a seal having a micro-textured surface. It is especially preferred for the micro-textured surface to be located at a position on the seal whereby lubricant can be released so as to lubricate the space between the seal and a surface contacting the seal. As such, the resulting seal will advantageously hold a small amount of lubricant that can be slowly released when the seal is in use. The released oil will lubricate the interface between the seal and a surface or a movable part so that friction is reduced and hopefully the life of the seal is increased.

It is believed that it has not been known in the past to micro-texture a seal, as such methods for producing a micro-textured seal are believed to be unknown. To produce a seal having a micro-textured surface a mold must be produced which can be used to form the micro-textured seal. However, methods for imparting a micro-texture construction to a mold used to form a seal have been unknown. Thus, the present invention relates to a method for producing a mold having a micro-textured surface.

The method is initiated by developing an image of a desired micro-texture surface. Any image can be developed so long as the resulting micro-texture surface in the mold will allow for production of a seal that holds an amount of oil that will lubricate the interface between the seal and the wall or any other structure contacted by the seal, while still allowing the seal to prevent leakage of liquids. It is important that the image allow for production of a micro-textured seal that reduces the friction between the seal and either a wall or moving part by releasing an amount of lubricant. Preferably, the image when transferred to a mold will result in a rough or textured surface on a seal, with the surface having a plurality of peaks and valleys, so that the depth of the texturing will range between about 0 microns and about 500 microns. The image can be computer generated or can be taken from an actual surface.

After the image is developed it is necessary to transfer the image to a mold, so that the image results in the mold having a micro-texture surface. A variety of means can be used to transfer the image, including a variety of photoresist techniques. Generally, the image can be used to form a mask, with the mask then used to etch the surface of the mold and thereby micro-texture such surface. More preferably, the image is used to create a photograph negative, with the negative placed on a photosensitive plate. The negative will then be developed on the photosensitive plate. Wax will next preferably be applied to the photosensitive plate, with the wax only adhering to the exposed areas of the plate. The exposed areas are those areas which are not to be etched, meaning that the exposed areas are those areas where a valley on the surface will not be formed. The wax is preferably transferred by contact paper to a mold. Next the mold will be submerged in an acid bath so that the acid will etch the mold and form the micro-texturing on the mold surface. Preferably, the mold is made of steel. After a sufficient time in the acid bath, the mold will have a micro-texture surface and will be suitable for use in forming a seal.

The present invention is advantageous for a number of reasons. First, it allows for a method for micro-texturing a mold used to form a seal. It has previously been difficult to micro-texture molds used to form a seal, and in fact it has been previously unknown to produce seals having a micro-texture surface. The present method is also easily and relatively inexpensively performed. Advantageously, the present method results in a mold that can form a seal that lubricates the interface between the seal and a surface contacted by the seal and that does not allow for liquids to leak.

BEST MODE FOR CARRYING OUT THE INVENTION

The present invention relates to a method for micro-texturing a mold and more specifically to a method for micro-texturing a steel mold used to form a micro-textured elastomeric seal. The method includes creating an image of the desired micro-texture surface, transferring the image to a mold, with the image imprinted into the mold by acid etching. Once the micro-texture pattern is etched into the mold, a seal can be formed from the mold. The seal will be advantageous because it will have a micro-texture pattern located on the surface of the seal. Importantly, the micro-textured seal will allow for increased lubricity between the surface of the seal and a surface contacted by the seal so that friction resulting from the seal and the surface movably contacting one another will be reduced. The seal, however, will still suitably prevent the leakage of liquids. Thus, the present method involves forming a micro-texture pattern on a steel mold so that a micro-textured seal can be formed therefrom.

The method is initiated by creating an image of a desired micro-texture surface. Any of a variety of surfaces can be created so long as a rough texture is created that can be used to form a seal having the above discussed desired characteristics. When the image is transposed on a mold, a seal made from the mold should be micro-textured so that oil or other lubricants can be held by the seal in a manner sufficient that the oil or lubricant is released over time to lubricate the interface between the seal and a surface. An image can be created by using a computer program to generate the desired image or an actual surface can be used to generate an image. If an actual surface is used, a picture can be taken of the surface, with the resulting photograph adjusted in size to assure that the image will result in a micro-textured surface on a mold.

Once the image has been generated it is necessary to project the image onto a mold so that the mold will have a micro-textured surface. The image can be used to form a mask which in turn can be used to etch the mold surface. The formation of a mask is one means by which the surface of the mold can be etched. The transfer of the image can be achieved using a variety of methods, however, the following steps are most preferred. From the image a negative is preferably formed. The preferred way to form the negative is to take a photograph of the image and then use the negative from the photograph. Dependent on how the image is formed, a negative could be formed directly from the image. The purpose of the negative is too use it as part of a photoresist process whereby acid or other etching constituents can be used to form the micro-textured surface on the mold. While the use of a negative is preferred, other methods can be used. It is important to remember that the image must be etched into a mold. As such, any method can be used to texturize the mold so long as the desired micro-textured surface is formed into the mold.

If a negative is formed, it is next preferred to place the negative over a photosensitive plate and expose the negative to light. The light will cause a reaction so that exposed areas of the negative will be transposed onto the photosensitive plate. The exposed areas will be those portions of the negative that do not form the valleys or etched portion of the mold. The unexposed areas will be the portion of the mold that is etched so that the etched part of the mold will be slightly eroded by the acid or other etching material.

Wax can be placed on the photosensitive plate, with the wax only adhering to the exposed areas of the plate. In other words, the wax will attach to what will be the peaks of the surface, with the areas not having wax forming depressions so that a texture is created. While wax is preferred any means of identifying the exposed and unexposed areas of the photosensitive plate can be used.

After application of the wax to the photosensitive plate, transfer paper is placed over the wax. Some amount of wax will attach to the transfer paper, with the transfer paper used to transfer the wax to the mold. Once the transfer paper is placed on the steel mold, the wax will then affix to the steel mold, with the portion of the mold where the wax is located being the place on the mold not etched by acid. Essentially, the wax prevents acid etching on parts of the mold surface.

Once the wax has been transferred to the mold, the mold is submerged in an acid or an acid mixture bath. The acid will slowly remove or degrade portions of the mold not covered by wax, so that a texture is formed into the mold, thereby creating a textured mold. The depth of the features or texture formed in the mold will be dependent upon the amount of time the mold is left in the acid and the material used to form the mold. Also, the amount of time the mold is left in the acid will depend on the pH of the acid, the desired depth of the texture, and the hardness of the metal or other material used to form the mold. Generally, it is desired for the texturing to have a depth ranging between about 0 microns and about 500 microns. More preferably, the depth of the texturing on the mold will range between about 10 microns and about 50 microns. The depth, however, will be dependent upon the seal formed from the mold. The depth should be such that a seal formed from the mold will hold an amount of oil or lubricant, but not hold the oil or lubricant in a way that will prevent migration of the lubricant away from the seal. Thus, the depth should be such that the lubricity between the seal and a surface contacted by the seal is increased.

It is preferred to use steel to form the mold, however, any metal or composite can be used that can be etched with acid and that can impart the desired micro-texture surface characteristics to a seal. Also, any acid can be used to etch the mold so long as the acid sufficiently degrades the material used to form the mold. Alternatively, other means can be used to etch the mold so long as the micro-texture patterning is sufficiently etched into the surface of the mold.

After the acid has etched the steel mold, the etched mold should be cleaned to remove the wax and acid from the mold. The mold is now ready to be used to form a member or seal. A variety of seals can be formed from the mold produced according to the present invention. In particular, rotating seals, oscillating seals, rotating seal rings, and sliding seals to name but a few examples, can be formed. More particularly, rotating seals such as shaft seals for all types of engines can be formed, as well as, oscillating seals such as pin joint seals and tract seals can be formed. Also, rotating seal rings such as transmission seal rings can be formed and sliding seals such as hydraulic cylinder seal and fuel injector seals can be formed. To form a particular type of seal a liquefied elastomeric mixture, for example, is poured into the mold and allowed to cure. This will form a seal having the micro-textured surface. It should be noted that in this application "poured" has a broad meaning, as it includes any means of putting elastomeric material in contact with the micro-textured mold to form a seal. As such, "pouring" means placing any of a variety of elastomeric or other casting materials in the mold to form a member having a micro-textured surface.

While it is preferred to form a seal from the process of the present invention any of a variety of devices and members can be formed therefrom. This process can be used to micro-texture the surface of a wide range of molded products. Thus, seals are preferred but other devices that have a micro-textured surface can be formed from this method.

INDUSTRIAL APPLICABILITY

The present invention is advantageous because it can be used to form a mold having a micro-textured surface. The mold can in turn be used to form a seal having a micro-textured surface. The seal formed from the present mold is advantageous because the seal will typically have a longer life as a result of reduced friction between the seal and surfaces movably contacted by the seal. Additionally, other methods apparently are not available that allow for the cost effective formation of a mold to form a micro-textured seal. As such, the present invention is useful in industry because it allows for the formation of useful seal molds which can be used to form seals having a longer useful life, which in turn may help prolong the life of a transmission, for example.

Other aspects, objects and advantages of the present invention can be obtained from a study of the disclosure and the appended claims.

What is claimed is:

1. A method for micro-texturing a mold comprising the steps of:
   (a) creating an image of a desired micro-texture surface of a mold;
   (b) photographically reproducing the image of the micro-texture surface of the mold to form a negative;
   (c) developing the negative of the image of the surface of the mold over a photosensitive plate to establish exposed and unexposed areas of the photosensitive plate;
   (d) creating a protective mask of the exposed areas of the photosensitive plate;
   (e) transferring the protective mask of the exposed areas of the photosensitive plate to a surface of the mold, the protective mask determining a portion of the mold surface not to be modified; and
   (f) exposing the mold surface to an acid so as to acid etch the mold surface not covered by the protective mask and impart the micro-texture to the mold surface.

2. The method of claim 1 wherein the step of creating a protective mask of the exposed areas of the photosensitive plate further comprises applying an amount of wax to the photosensitive plate, the wax adhering to the exposed areas of the photosensitive plate.

3. The method of claim 2 wherein the step of transferring the protective mask of the exposed areas of the photosensitive plate to a surface of the mold further comprises transferring the wax on the photosensitive plate to transfer paper and then contacting the transfer paper on the surface of the mold so that the wax is placed on the surface of the mold.

4. The method of claim 1 wherein the image of the desired micro-texture surface is created from a computer generated image or from a photograph of an actual surface.

5. The method of claim 1 wherein the acid etches the surface of the mold to a depth ranging between less than 1 micron and about 500 microns to form the micro-texture to the mold surface.

6. The method of claim 5 wherein the acid etches the surface of the mold to a depth ranging between about 10 microns and about 50 microns.

7. The method of claim 1 wherein the mold surface is steel.

8. The method of claim 1 wherein the mold is a mold for forming elastomeric seals.

9. A method for producing a seal having a micro-textured pattern on a surface of the seal, wherein the method is comprised of:
   (a) creating an image of a desired micro-texture pattern;
   (b) photographically reproducing the image of the micro-texture pattern;
   (c) creating a protective mask from the image of the micro-texture pattern;
   (d) transferring the protective mask to a mold;
   (e) exposing the mold to an amount of acid so as to acid etch the mold thereby imparting the micro-texture pattern to the mold; and
   (f) forming an elastomeric seal from the mold by pouring a liquefied elastomeric material into the mold and allowing the elastomeric material to cure into the seal having the micro-textured pattern.

10. A method for micro-texturing a mold, with the mold used to produce a member having a micro-textured surface so that the member retains an amount of lubricant and reduces friction resulting from the member movably contacting a surface of another object while preventing leakage of liquids, wherein said method is comprised of:

(a) creating an image of a desired micro-texture surface;

(b) photographically reproducing the image of the micro-texture surface to form a negative;

(c) using the negative to transfer a pattern of the micro-texture image to a mold, with the pattern determining which portion of the mold will be removed by acid, wherein the negative is developed over a photosensitive plate so that exposed and unexposed areas from the negative are transferred onto the plate resulting in the plate having the exposed and unexposed areas and an amount of wax is applied to the photosensitive plate, the wax adhering to the exposed areas of the plate; and, (d) exposing the mold to an amount of acid so as to acid etch the mold's surface and impart the micro-texture pattern to the surface of the mold to form a mold with a micro-texture surface.

11. A method for micro-texturing a mold, with the mold used to produce a member having a micro-textured surface so that the member retains an amount of lubricant and reduces friction resulting from the member movably contacting a surface of another object while preventing leakage of liquids, wherein said method is comprised of:

(a) creating an image of a desired micro-texture surface;

(b) photographically reproducing the image of the micro-texture surface to form a negative;

(c) using the negative to transfer a pattern of the micro-texture image to a mold, with the pattern determining which portion of the mold will be removed by acid, wherein the negative is developed over a photosensitive plate so that exposed and unexposed areas from the negative are transferred onto the plate resulting in the plate having the exposed and unexposed areas and an amount of wax is applied to the photosensitive plate, the wax adhering to the exposed areas of the plate, and contacting the wax on the photosensitive plate with transfer paper and then contacting the mold with the transfer paper having an amount of wax adhered thereto so that the wax is placed on the surface of the mold, and the acid will then etch that portion of the mold not covered by the wax; and, (d) exposing the mold to an amount of acid so as to acid etch the mold's surface and impart the micro-texture pattern to the surface of the mold to form a mold with a micro-texture surface.

* * * * *